(12) United States Patent
Rueggen et al.

(10) Patent No.: US 8,197,263 B2
(45) Date of Patent: Jun. 12, 2012

(54) ELECTRIC CONNECTION RECEPTABLE FOR A SOLAR CELL MODULE

(75) Inventors: Christian Rueggen, Bochum (DE);
Kay-Hendryk Schmidt, Witten (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 1 day.

(21) Appl. No.: 12/967,165

(22) Filed: Dec. 14, 2010

(65) Prior Publication Data

US 2011/0092094 A1   Apr. 21, 2011

Related U.S. Application Data

(63) Continuation of application No. PCT/EP2009/057215, filed on Jun. 10, 2009.

(30) Foreign Application Priority Data

Jun. 14, 2008  (DE) .......................... 10 2008 028 462

(51) Int. Cl.
*H01R 12/00* (2006.01)
(52) U.S. Cl. ..................................................... 439/76.1
(58) Field of Classification Search .................. 439/76.1, 439/862, 441, 835, 936
See application file for complete search history.

(56) References Cited

U.S. PATENT DOCUMENTS

| | | | | |
|---|---|---|---|---|
| 5,816,867 | A * | 10/1998 | Davidsz et al. | 439/828 |
| 6,344,612 | B1 | 2/2002 | Kuwahara et al. | |
| 6,488,527 | B2 * | 12/2002 | Yoon | 439/441 |
| 6,582,249 | B1 * | 6/2003 | Boeck et al. | 439/492 |
| 6,911,602 | B2 * | 6/2005 | Conrad | 174/68.2 |
| 7,134,883 | B2 | 11/2006 | Werner et al. | |
| 7,530,837 | B2 * | 5/2009 | Nieleck et al. | 439/441 |
| 7,845,969 | B2 * | 12/2010 | Stadler et al. | 439/441 |
| 2005/0054219 | A1 * | 3/2005 | Werner et al. | 439/76.1 |
| 2005/0054244 | A1 * | 3/2005 | Werner et al. | 439/682 |
| 2006/0289053 | A1 * | 12/2006 | Nieleck et al. | 136/244 |

FOREIGN PATENT DOCUMENTS

| | | |
|---|---|---|
| DE | 102006012665 A1 | 10/2006 |
| EP | 0999601 A1 | 5/2000 |

OTHER PUBLICATIONS

International Bureau, International Preliminary Report for the corresponding PCT/EP2009/057215 mailed Mar. 24, 2011.

* cited by examiner

*Primary Examiner* — Jean F Duverne
(74) *Attorney, Agent, or Firm* — Brooks Kushman P.C.

(57) ABSTRACT

An electric receptacle and junction box for a solar cell module includes an enclosure base and an enclosure cover. The base has a first connector element for electrically contacting a strip conductor of a solar cell module, and a first conductor rail electrically connected to the first connector element. The cover has a second connector element for electrically contacting an output line, and a second conductor rail electrically connected to the second connector element. The first connector element and the first conductor rail are rigidly mechanically connected to the base. The second connector element and the second conductor rail are rigidly mechanically connected to the cover. Electrical contact is made between the first connector element and the first conductor rail and the second connector element and the second conductor rail in response to the enclosure cover and the enclosure base being joined together.

8 Claims, 3 Drawing Sheets

ELECTRIC CONNECTION RECEPTABLE FOR A SOLAR CELL MODULE

CROSS-REFERENCE TO RELATED APPLICATIONS

This application is a continuation of International Application No. PCT/EP2009/057215, published in German, with an international filing date of Jun. 10, 2009, which claims priority to DE 10 2008 028 462.9, filed Jun. 14, 2008; the disclosures of which are incorporated by reference.

TECHNICAL FIELD

The present invention relates to an electric receptacle and junction box for connecting to a solar cell module in which the box includes a housing having an enclosure base and an enclosure cover in which a first connector element for electrically contacting strip conductors of the solar cell module, second connector elements for electrically contacting output lines, and conductor rails connected respectively to the first and second connector elements are contained.

BACKGROUND

The connecting equipment for such receptacle and junction boxes used with solar cell modules connects the connecting conductors of the solar cell modules, which are generally formed as thin strip conductors on one side, and the output lines leading, for example, to an AC converter on the other side.

The solar cells in a solar cell module are generally connected to one another by thin strip conductors. The strip conductors typically have a thickness of a few tenths of millimeters and a width of several millimeters. The strip conductors that connect the individual solar cells of the solar cell module are designed so that the strip conductors can be used directly for connection purposes.

To make a connection, the strip conductors are typically introduced from below into the electric receptacle and junction box which has a removable cover so that the individual strip conductors can be connected with the aid of the electrical connecting equipment in the receptacle and junction box enclosure. The connecting equipment includes so-called conductor rails. The conductor rails are formed from sheet metal as bent stamped parts having good electrical conductivity, and are used to connect the voltages. In order to connect the strip conductors with the conductor rails, spring clamps or soldered contacts can be used.

DE 203 11 184 U1 (corresponding to U.S. Pat. No. 7,134,883) describes an electric receptacle and junction box for a solar cell module. In this box, conductor rails with connecting elements are contained in the enclosure base both for the strip conductors of the solar modules and for making the electrical connection to the output lines. A supplementary circuit board for mounting bypass diodes simplifies their replacement if needed, but at the cost of a relatively expensive overall assembly.

SUMMARY

An object of the present invention is a receptacle and junction box for connecting to a solar module in which the box enables relatively simple manipulation if service is needed and does so through an exceptionally simple and robust overall assembly.

In carrying out the above object and other objects, the present invention provides an electrical receptacle and junction box for a solar cell module. The junction box (or housing) includes an enclosure base and an enclosure cover. The junction box houses a connection device having first connection elements for electrically contacting the conduction strips of the solar cell module and second connection elements for electrically contacting the outlet lines and busbars connected to the first and second connection elements, respectively. First components of the connection device are solidly connected to the enclosure base. Second components of the connection device are solidly connected to the enclosure cover. When the enclosure cover is joined to the enclosure base, the first and second components of the connection device are contacted to one another electrically.

In an electrical receptacle and junction box in accordance with embodiments of the present invention, the first component of the connecting equipment or device is rigidly connected to the enclosure base, the second component of the connecting equipment or device is rigidly connected to the enclosure cover, and the electrical contact is made between the first and second components of the connecting equipment by joining the enclosure cover together with the enclosure base.

In an electrical receptacle and junction box in accordance with embodiments of the present invention, conductor rails connected to the first connector elements are connected to the enclosure base and conductor rails connected to the second connector elements are connected to the enclosure cover, and when the enclosure cover is brought together with the enclosure base they have internally engaging electrical contact elements in the form of knife contacts and contact tongues provided to respectively cooperate with the knife contacts.

A particularly good transfer of heat of the thermal losses produced by bypass diodes that may be incorporated in the receptacle and junction box is thereby achieved by providing that the bypass diodes are connected to the enclosure cover as SMD (Surface Mounted Device) components. In particular, the bypass diodes are soldered to the conductor rails which are implemented as large surface area strip conductors.

The electrical contacts of the first connecting element to the strip conductors of the solar cell module, as well as the second connecting element to the output lines, are preferentially implemented as soldered connections.

The above features, and other features and advantages of the present invention are readily apparent from the following detailed descriptions thereof when taken in connection with the accompanying drawings.

DETAILED DESCRIPTION

Figure 1:
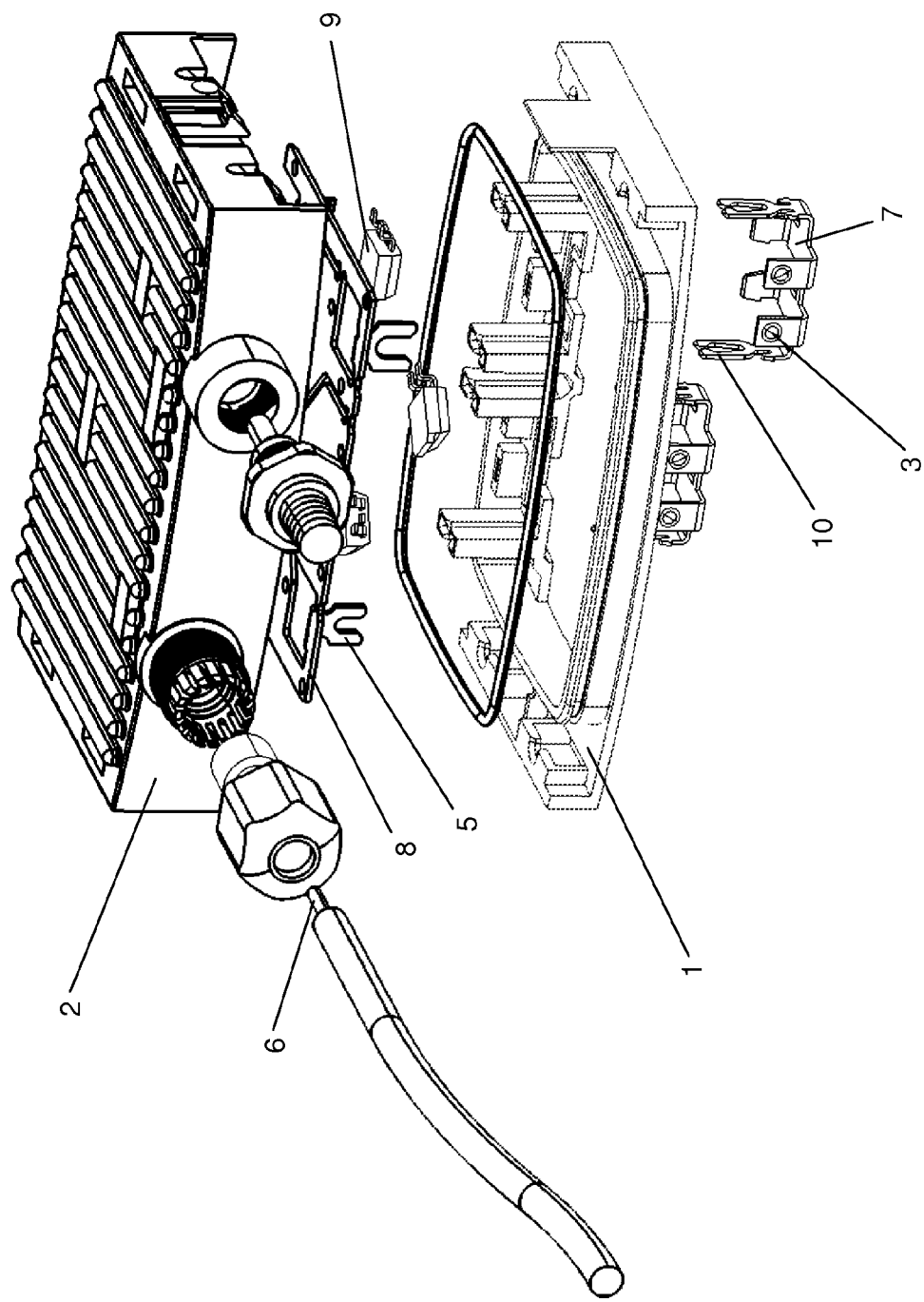
FIG. 1 illustrates an exploded view of a receptacle and junction box in accordance with an embodiment of the present invention.
Figure 2:
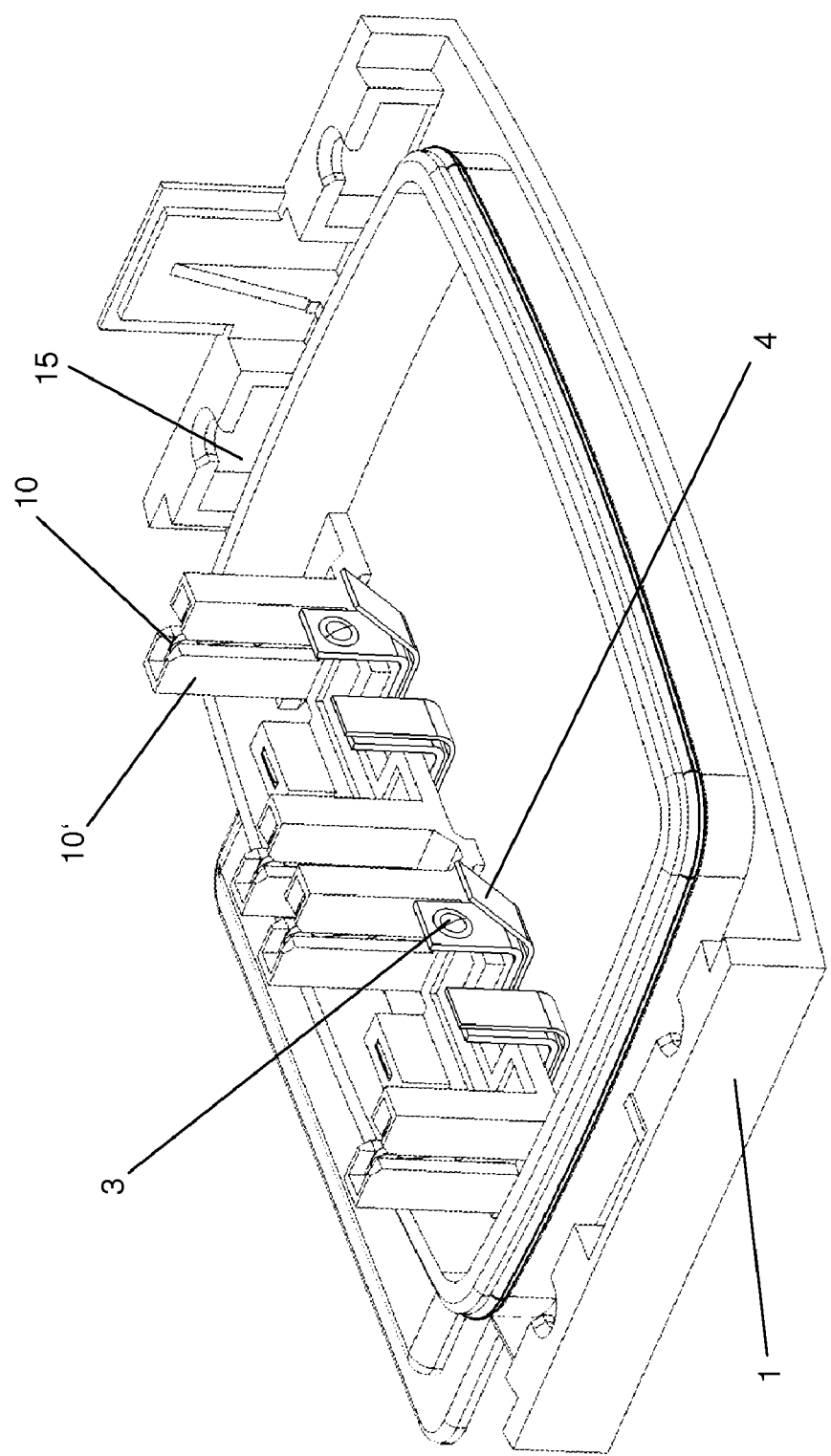
FIG. 2 illustrates the enclosure base of the receptacle and junction box of FIG. 1 with connecting lines from a solar cell module.
Figure 3:
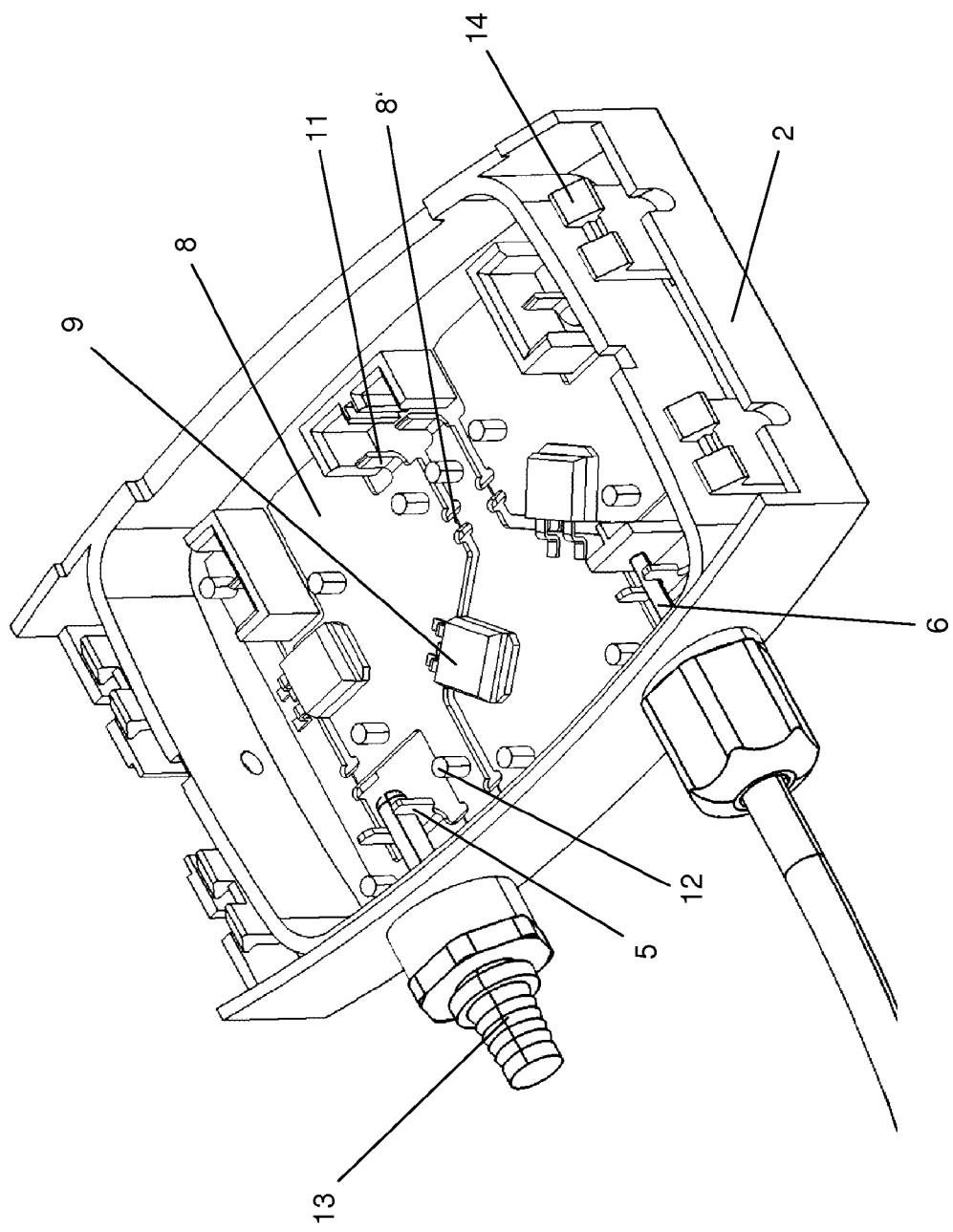
FIG. 3 illustrates the enclosure cover of the receptacle and junction box of FIG. 1 as seen from below.

Referring now to FIGS. 1, 2, and 3, a receptacle and junction box (i.e., connecting box or housing) for connecting to a solar module in accordance with an embodiment of the present invention will now be described.

As shown in FIG. 1, the receptacle and junction box includes an enclosure base 1 (i.e., a housing base) and an enclosure cover 2 (i.e., a housing cover). As described herein, enclosure cover 2 joins with enclosure base 1 to form the assembled receptacle and junction box.

FIG. 2 illustrates enclosure base 1. That is, FIG. 2 illustrates the receptacle and junction box with enclosure cover 2 being removed therefrom.

FIG. 3 illustrates enclosure cover 2. That is, FIG. 3 illustrates the receptacle and junction box with enclosure base 1 removed therefrom.

Enclosure base 1 is mounted in a connection region of a solar cell module, and is attached to it, for example, by an adhesive. The individual solar cells of the solar module (not shown) are connected to one another by thin strip conductors 4. Strip conductors 4 typically have a thickness of several tenths of a millimeter and a width of several millimeters. Strip conductors 4 are routed out of the solar cell module and can be used directly for making connections at that point. Strip conductors 4 are introduced from below into enclosure base 1 where they can then come into contact with the electrical connecting equipment.

Enclosure base 1 includes connecting equipment having a plurality of conductor rails 7. Similarly, enclosure cover 2 includes connecting equipment having a plurality of conductor rails 8. Conductor rails 7, 8 are fabricated from a sheet metal having good electrical conductivity in the form of bent punched components that serve to connect the voltages inside the connecting equipment.

Conductor rails 7 of enclosure base 1 are provided with connecting elements 3 that are bent upwards in a perpendicular direction from the plane parallel to the surface of the solar cell module. Strip conductors 4 of the solar cell module are connected rigidly by soldered connections both electrically and mechanically by connection elements 3. Furthermore, the sections of the conductor rails 7 bent upwards perpendicular from the plane parallel to the surface of the solar cell module are formed as knife contacts 10. Knife contacts 10 are provided to respectively connect with mating contacts or contact tongues 11 intended for this purpose in enclosure cover 2. Knife contacts 10 are thereby enclosed in isolation chambers 10' that are molded integrally on enclosure base 1.

As indicated, enclosure cover 2 to be attached to complete the enclosure, and thus the entire receptacle and junction box, can be seen in FIG. 3. Enclosure cover 2 likewise contains conductor rails 8 that are formed as large surface area strip conductors in this case. Conductor rails 8 are inserted during fabrication as a one piece punch grid into enclosure cover 2. Positioning and retaining pins 12 molded on enclosure cover 2 project through holes in the punch grid. Positioning and retaining pins 12 are then fixed in place in their upper region, whereby the individual sections of the punch grid are uniquely fixed, and can be disconnected by separating the various voltages at disconnect points 8' provided for this purpose.

Conductor rails 8 of enclosure cover 2 are provided with connecting elements 5 that are bent perpendicular from its primary plane of extension. Output lines 6 from the solar cell module that lead to additional solar cell modules or to an AC inverter are connected rigidly by solder connections both electrically and mechanically through connecting elements 5. Output lines 6 are drawn as insulated round wires. Output lines 6 are either inserted directly into a connection hole, that can be seen on the front side of enclosure cover 2, held fast by a coupling nut and soldered with its uninsulated current conductor to connecting element 5, or provided with a plug-in connector whose mating contact 13 is introduced into the connection hole and soldered to connecting element 5, as shown in FIG. 3.

Contact tongues 11 provided for making contact with knife contacts 10 that are present in enclosure base 1 are likewise bent perpendicular from the primary plane of extension of conductor rails 8 of enclosure cover 2. Bypass diodes 9 of the receptacle and junction box are connected to conductor rails 8 of enclosure cover 2. Bypass diodes 9 are connected anti-parallel to the solar cells and insure that if a shaded solar cell is present within a solar cell module, it will of course no longer contribute to the total voltage of the solar cell module, but the flow of current nonetheless remains unchanged. The solar cell module thereby exhibits only a reduced operating voltage, but does not completely drop out, as would be the case without bypass diodes 9. Moreover, power will no longer be converted in the shaded solar cell, so that damage to the shaded solar cells can be prevented. However, a power loss is produced that can take on significant proportions, which leads to a corresponding development of heat due to the current, which is conducted through bypass diodes 9 provided to protect the affected solar cells, from the solar cells not affected by the shading, as is normally the case. Bypass diodes 9 are mounted on conductor rails 8 as SMD components and are soldered in a reflux soldering process to the conductor rails. The one connection of bypass diodes 9 is thereby formed by the legs visible in FIGS. 1 and 3, and the other connector is located on the underside of the component.

Large effective strip conductor cross sections are implemented by the large surface area design of conductor rails 8 in enclosure cover 2, thus guaranteeing a correspondingly high current carrying capacity for the respective connection. Another effect of the large surface area strip conductors is that they can radiate a great deal of heat through their surface, and thus serve as a cooling element through which the power loss mentioned above for the heat developed by bypass diodes 9 can be transferred to the environment. Positioning this cooling element in enclosure cover 2, and thereby at the largest possible distance from the solar module, efficiently enhances this effect.

The receptacle and junction box is completed as shown in FIG. 1 by placing enclosure cover 2 on enclosure base 1 that is already attached to the solar cell module, for example, by an adhesive, and is electrically connected to strip conductors 4 so that contact tongues 11 of conductor rails 8 of enclosure cover 2 engage with knife contacts 10 of conductor rails 7 of enclosure base 1, and thereby produce the electrical connection between strip conductors 4 of the solar module and output lines 6. Clip hooks 14 formed on enclosure cover 2 thereby engage in dedicated clip ports 15 of enclosure base 1 and ensure a rapid and secure attachment of enclosure pieces 1, 2 with one another.

As required, detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric receptacle and junction box for a solar cell module, the box comprising:
    an enclosure base having a plurality of first conductor rails, each first conductor rail having a plurality of first connector elements for electrically contacting respective strip conductors of solar cells of a solar cell module, each first conductor rail further having a plurality of first electrical contact elements; and
    an enclosure cover having a plurality of second conductor rails, each second conductor rail having a second connector element for electrically contacting an output line, each second conductor rail further having a plurality of second electrical contact elements;
    wherein the first conductor rails are rigidly mechanically connected to the enclosure base;
    wherein the second conductor rails are rigidly mechanically connected to the enclosure cover;
    wherein the first electrical contact elements and the second electrical contact elements respectively internally engage to make electrical contact between the first connector elements and the first conductor rails and the second connector elements and the second conductor rails in response to the enclosure cover and the enclosure base being joined together.

2. The box of claim 1 wherein:
    each first electrical contact element is a knife contact and each second electrical contact element is a contact tongue.

3. The box of claim 1 further comprising:
    a bypass diode soldered to one of the second conductor rails.

4. The box of claim 1 wherein:
    each second conductor rail is a large area strip conductor.

5. The box of claim 1 wherein:
    each first connecting element for electrically contacting a strip conductor of the solar cell module is provided through a solder connection.

6. The box of claim 1 wherein:
    each second connecting element for electrically contacting an output line is provided through a solder connection.

7. The box of claim 1 wherein:
    the conductor rails are bent parts punched from an electrical conductive sheet material.

8. The box of claim 1 wherein:
    the enclosure base further includes a plurality of isolation chambers in which the first electrical contact elements are respectively held within.

* * * * *